US007419430B1

(12) United States Patent
Joshi et al.

(10) Patent No.: US 7,419,430 B1
(45) Date of Patent: Sep. 2, 2008

(54) WAGERING GAME FOR TRACKING VARIOUS TYPES OF WAGER INPUTS

(75) Inventors: Shridhar P. Joshi, Naperville, IL (US); William R. Wadleigh, Lisle, IL (US)

(73) Assignee: WMS Gaming, Inc., Waukegan, IL (US)

( * ) Notice: Subject to any disclaimer, the term of this patent is extended or adjusted under 35 U.S.C. 154(b) by 282 days.

(21) Appl. No.: 11/154,883

(22) Filed: Jun. 16, 2005

(51) Int. Cl.

| | |
|---|---|
| ***G06F 19/00*** | (2006.01) |
| ***G06F 17/00*** | (2006.01) |
| ***A63F 13/00*** | (2006.01) |
| ***A63F 9/24*** | (2006.01) |

(52) U.S. Cl. .............................. 463/27; 463/9; 463/292

(58) Field of Classification Search ............... 463/1–49; 273/138.1–309
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,695,053 | A | 9/1987 | Vazquez, Jr. et al. | 463/18 |
| 4,837,728 | A | 6/1989 | Barrie et al. | 364/412 |
| 4,861,041 | A | 8/1989 | Jones et al. | 273/292 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 273/85 |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,417,430 | A | 5/1995 | Breeding | 273/292 |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |

(Continued)

FOREIGN PATENT DOCUMENTS

| | | |
|---|---|---|
| CA | 2 334 546 | 8/2001 |

(Continued)

OTHER PUBLICATIONS

Article for "Easy Riches" by Sigma Game, Strictly Slots, 1 page (Aug. 2001).

(Continued)

*Primary Examiner*—Robert E Pezzuto
*Assistant Examiner*—Paul A. D'Agostino
(74) *Attorney, Agent, or Firm*—Nixon Peabody, LLP.

(57) ABSTRACT

A gaming system includes a plurality of linked gaming machines and a controller coupled to the gaming machines. The gaming machines are used for playing one or more wagering games having a plurality of symbols that indicate a randomly selected outcome. Each gaming machine includes at least one wager-input device for receiving a first type of wager, which allows the player to play the wagering game, and the second type of wager, which allows the player to be eligible for a progressive jackpot. The controller determines a first cumulative value of the first type of wagers, a second cumulative value of the second type of wagers, and a distributable wager pool that is derived from a portion of the first cumulative value and a portion of the second cumulative value. The distributable wager pool can fund the progressive jackpot.

27 Claims, 6 Drawing Sheets

U.S. PATENT DOCUMENTS 5,577,959 A 11/1996 Takemoto .................... 463/25
5,580,063 A 12/1996 Edwards ..................... 273/378
5,580,309 A 12/1996 Piechowiak et al. ........... 463/16
5,611,730 A 3/1997 Weiss ......................... 463/20
5,645,486 A 7/1997 Nagao et al. .................. 463/27
5,647,592 A 7/1997 Gerow ........................ 463/139
5,655,961 A 8/1997 Acres et al. ................... 463/27
5,766,076 A 6/1998 Pease et al. ................... 463/27
RE35,864 E 7/1998 Weingardt ................... 463/28
5,779,549 A 7/1998 Walker et al. ................. 463/42
5,795,225 A * 8/1998 Jones et al. ................... 463/13
5,816,918 A 10/1998 Kelly et al. ................... 463/16
5,820,459 A 10/1998 Acres et al. ................... 463/25
5,823,874 A 10/1998 Adams ........................ 463/17
5,839,956 A 11/1998 Takemoto .................... 463/25
5,848,932 A 12/1998 Adams ........................ 463/20
5,851,147 A 12/1998 Stupak ........................ 463/13
5,855,515 A 1/1999 Pease et al. ................... 463/27
5,876,284 A 3/1999 Acres et al. ................... 463/25
5,885,158 A 3/1999 Torango et al. ............... 463/27
5,941,773 A 8/1999 Harlick ........................ 463/26
5,944,606 A 8/1999 Gerow ......................... 463/27
5,951,011 A 9/1999 Potter et al. ................. 273/292
6,003,013 A 12/1999 Boushy et al. ................ 705/10
6,007,427 A 12/1999 Wiener et al. ................. 463/17
6,012,982 A 1/2000 Piechowiak et al. ........... 463/16
6,032,955 A 3/2000 Luciano et al. .......... 273/138.1
6,047,963 A 4/2000 Pierce et al. ............ 273/121 B
6,056,642 A 5/2000 Bennett ....................... 463/20
6,068,552 A 5/2000 Walker et al. ................. 463/21
6,089,977 A 7/2000 Bennett ....................... 463/20
6,089,980 A 7/2000 Gauselmann ................ 463/27
6,102,474 A 8/2000 Daley ......................... 296/836
6,102,799 A 8/2000 Stupak ........................ 463/27
6,110,041 A 8/2000 Walker et al. ................. 463/20
6,110,043 A 8/2000 Olsen .......................... 463/27
6,139,013 A 10/2000 Pierce et al. ............ 273/121 B
6,142,872 A 11/2000 Walker et al. ................. 463/16
6,146,273 A 11/2000 Olsen .......................... 463/27
6,155,925 A 12/2000 Giobbi et al. ................. 463/20
6,158,741 A 12/2000 Koelling ..................... 273/292
6,159,096 A 12/2000 Yoseloff ...................... 463/20
6,159,097 A 12/2000 Gura ........................... 463/20
6,168,523 B1 1/2001 Piechowiak et al. ........... 463/26
6,190,254 B1 2/2001 Bennett ....................... 463/13
6,203,010 B1 3/2001 Jorasch et al. ........... 273/138.1
6,206,374 B1 3/2001 Jones ......................... 273/292
6,206,782 B1 3/2001 Walker et al. ................. 463/25
6,210,275 B1 4/2001 Olsen .......................... 463/16
6,210,277 B1 4/2001 Stefan ......................... 463/27
6,217,448 B1 4/2001 Olsen .......................... 463/25
6,220,593 B1 4/2001 Pierce et al. ............. 273/138.1
6,224,482 B1 5/2001 Bennett ....................... 463/20
6,224,484 B1 5/2001 Okuda et al. .................. 463/27
6,231,445 B1 5/2001 Acres .......................... 463/42
6,241,608 B1 6/2001 Torango ...................... 463/27
6,251,013 B1 6/2001 Bennett ....................... 463/13
6,254,483 B1 7/2001 Acres .......................... 463/26
6,283,474 B1 * 9/2001 de Keller .................... 273/274
6,312,332 B1 11/2001 Walker et al. ................. 463/23
6,315,660 B1 11/2001 DeMar et al. ................. 463/16
6,319,125 B1 11/2001 Acres .......................... 463/25
6,319,127 B1 11/2001 Walker et al. ................. 463/26
6,336,859 B2 1/2002 Jones et al. ................... 463/13
6,336,862 B1 1/2002 Byrne ......................... 463/27
6,345,824 B1 2/2002 Selitzky ...................... 273/292
6,350,199 B1 2/2002 Williams et al. .............. 463/16
6,358,149 B1 3/2002 Schneider et al. ............. 463/27
6,361,441 B1 3/2002 Walker et al. ................. 463/42
6,364,768 B1 4/2002 Acres et al. ................... 463/25
6,375,189 B1 * 4/2002 Jones ......................... 273/292
6,375,567 B1 4/2002 Acres .......................... 463/25
6,375,568 B1 4/2002 Roffman et al. ............... 463/26
6,416,409 B1 7/2002 Jordan ......................... 463/27
6,431,983 B2 8/2002 Acres .......................... 463/25
6,435,968 B1 8/2002 Torango ...................... 463/27
6,439,995 B1 8/2002 Hughs-Baird et al. ......... 463/20
6,482,089 B2 11/2002 DeMar et al. ................. 463/20
6,506,117 B2 1/2003 DeMar et al. ................. 463/20
6,508,707 B2 1/2003 DeMar et al. ................. 463/16
6,517,433 B2 2/2003 Loose et al. .................. 463/20
6,520,855 B2 2/2003 DeMar et al. ................. 463/20
6,520,856 B1 2/2003 Walker et al. ................. 463/21
6,577,733 B1 6/2003 Charrin ...................... 380/251
6,589,115 B2 7/2003 Walker et al. ................. 463/25
6,592,458 B1 7/2003 Ho .............................. 463/17
6,592,460 B2 7/2003 Torango ...................... 463/27
6,599,186 B1 7/2003 Walker et al. ................. 463/17
6,599,188 B2 7/2003 Hirsch et al. .................. 463/19
6,599,193 B2 7/2003 Baerlocher et al. ............ 463/27
6,601,771 B2 8/2003 Charrin ...................... 235/492
6,648,762 B2 11/2003 Walker et al. ................. 463/25
6,656,052 B2 12/2003 Abramopoulos et al. ...... 463/47
6,676,513 B2 1/2004 Gauselmann ................ 463/20
6,712,695 B2 3/2004 Mothwurf et al. ............. 463/25
6,731,313 B1 5/2004 Kaminkow ................ 715/839
6,733,390 B2 5/2004 Walker et al. ................. 463/23
6,776,715 B2 8/2004 Price ........................... 463/27
6,887,154 B1 5/2005 Luciano, Jr. et al. .......... 463/26
6,939,223 B1 9/2005 Jones .......................... 463/16
6,939,226 B1 9/2005 Joshi ........................... 463/20
6,960,136 B2 11/2005 Joshi et al. .................... 463/25
6,974,385 B2 12/2005 Joshi et al. .................... 463/20
7,004,466 B2 2/2006 Gauselmann ............... 463/138
7,036,012 B2 4/2006 Charrin ...................... 713/169
7,056,215 B1 6/2006 Olive .......................... 463/27
2002/0138594 A1 9/2002 Rowe ......................... 709/219
2002/0142825 A1 10/2002 Lark et al. .................... 463/16
2002/0142846 A1 10/2002 Paulsen ....................... 463/43
2002/0151345 A1 10/2002 Byrne ......................... 463/18
2002/0155874 A1 10/2002 Byrne ......................... 463/16
2002/0198037 A1 * 12/2002 Moody ........................ 463/18
2003/0003988 A1 1/2003 Walker et al. ................. 463/21
2003/0014370 A1 1/2003 Charrin ....................... 705/65
2003/0022714 A1 * 1/2003 Oliver ......................... 463/25
2003/0027618 A1 2/2003 Byrne ......................... 463/16
2003/0027625 A1 2/2003 Rowe .......................... 463/20
2003/0036430 A1 2/2003 Cannon ....................... 463/42
2003/0045337 A1 3/2003 Byrne ......................... 463/16
2003/0050106 A1 3/2003 Lyfoung ...................... 463/13
2003/0060266 A1 3/2003 Baerlocher ................... 463/20
2003/0064776 A1 4/2003 Byrne ......................... 463/16
2003/0109306 A1 6/2003 Karmarkar .................. 463/40
2003/0148808 A1 8/2003 Price ........................... 463/27
2003/0181231 A1 9/2003 Vancura et al. ................ 463/9
2003/0186733 A1 10/2003 Wolf et al. .................... 463/16
2003/0211884 A1 11/2003 Gauselmann ................ 463/20
2003/0216166 A1 11/2003 Baerlocher et al. ............ 463/20
2003/0222402 A1 12/2003 Olive ......................... 273/292
2003/0228899 A1 12/2003 Evans .......................... 463/25
2003/0236116 A1 12/2003 Marks et al. .................. 463/16
2004/0009808 A1 1/2004 Gauselmann ................ 463/25
2004/0009811 A1 1/2004 Torango ...................... 463/25
2004/0023716 A1 2/2004 Gauselmann ................ 463/23
2004/0038741 A1 2/2004 Gauselmann ................ 463/42
2004/0048644 A1 3/2004 Gerrard et al. ................ 463/16
2004/0053672 A1 3/2004 Baerlocher ................... 463/20
2004/0092304 A1 5/2004 George ........................ 463/29
2004/0097279 A1 5/2004 Gauselmann ................ 463/16
2004/0102234 A1 * 5/2004 Gold ........................... 463/13
2005/0003880 A1 1/2005 Engleman .................... 463/16
2005/0055113 A1 3/2005 Gauselmann ................ 700/91
2005/0059467 A1 3/2005 Saffari et al. .................. 463/19
2005/0059472 A1 3/2005 Joshi et al. .................... 463/20

| | | | | |
|---|---|---|---|---|
| 2005/0064930 | A1 | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0170890 | A1 | 8/2005 | Rowe et al. | 463/42 |
| 2005/0192088 | A1 | 9/2005 | Hartman et al. | 463/27 |
| 2005/0215313 | A1 | 9/2005 | O'Halloran | 463/26 |
| 2006/0003829 | A1 | 1/2006 | Thomas | 463/20 |
| 2006/0019737 | A1 | 1/2006 | Yang | 463/19 |
| 2006/0025195 | A1 | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0052159 | A1 | 3/2006 | Cahill et al. | 463/27 |
| 2006/0052160 | A1* | 3/2006 | Saffari et al. | 463/27 |
| 2006/0068894 | A1 | 3/2006 | Wadleigh et al. | 463/20 |
| 2006/0073887 | A1 | 4/2006 | Rodgers et al. | 463/20 |
| 2006/0073889 | A1 | 4/2006 | Edidin et al. | 463/27 |
| 2006/0116201 | A1 | 6/2006 | Gausselmann | 463/26 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1 | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher | 463/25 |
| 2007/0060319 | A1 | 3/2007 | Block et al. | 463/27 |
| 2007/0060365 | A1 | 3/2007 | Tien et al. | 463/42 |
| 2008/0020830 | A1* | 1/2008 | Ikehara et al. | 463/27 |

FOREIGN PATENT DOCUMENTS

| | | | |
|---|---|---|---|
| DE | 195 15 983 | A1 | 11/1996 |
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2313792 | A | 10/1997 |
| GB | 2 333 880 | | 8/1999 |
| WO | WO 99 03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for "Millioniser" by Glenn Haussman, Strictly Slots, pp. 50-53 (Mar. 2004).

Product Sheet for "Big Games Safari," IGT, 24 pages (2000).

"New '97 Games," International Gaming & Wagering Business, 24 pages (Mar. 1997).

* cited by examiner

26

WAGERING GAME FOR TRACKING VARIOUS TYPES OF WAGER INPUTS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and methods for playing wagering games, and more particularly, to a progressive wagering game system that accounts for different types of wagers made at the gaming machines.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

In many current wagering games, the progressive jackpot is funded in part by taking a percentage of the total coin-in received in the wagering game. After the progressive jackpot is won, the progressive jackpot will be reset to some basic level (e.g., $1,000 or $5,000). Every time a player makes a wager, a percentage of the wager is allocated to the progressive jackpot, or divided in some predetermined way among the progressive jackpots, assuming there is more than one progressive jackpot. As one example, a gaming machine manufacturer leases the machines to a gaming establishment (e.g., casino) that operates the machines. When considering the total coin-in value, in a typical arrangement, about 88% of the total coin-in is used for funding the payouts of the basic wagering games operated at the machines, about 8% of the total coin-in is returned to the gaming establishment, and about 4% is returned to the gaming machine manufacturer. To fund the progressive jackpot(s), the gaming machine manufacturer uses about 30% of its proceeds (i.e., about 1.2% of the total coin-in) for the reset value and the incremental value added to the jackpots over time as players compete for the progressive jackpot. In other lease-type arrangements, the gaming machine manufacturer receives a flat fee per machine per day (e.g., $80/day) from the gaming establishment and a smaller percentage of the total coin-in (e.g., 1.5%), which the gaming machine manufacturer uses for the funding the progressive as outlined above.

In these types of arrangements, there can be some inequity. For example, the gaming machines often present an option as to whether the player is eligible for the progressive jackpot (e.g., the player must play all the paylines, or play the maximum wager for the machine). In those situations when a player plays the wagering game without being eligible for the progressive jackpot, that player's wager is still applied in the percentages listed above, such that the player's wager is still contributing to the progressive jackpot although the player is ineligible for it. This can lead to extra funds for the gaming machine manufacturer while lowering the machine's overall payback percentage for that player. Gaming machine operators do not prefer this either because the gaming machine manufacturer may be making extra margins at their players' expense.

Thus, there is a need for a new type of a progressive game wager-input system and wager-tracking system, which takes into account additional wagers that the players make at the gaming machine to be eligible for the progressive jackpot.

SUMMARY OF THE INVENTION

The present invention satisfies the needs mentioned above in that it is a gaming system allowing players to be eligible for a progressive jackpot. The gaming system includes a plurality of linked gaming machines and a controller coupled to the plurality of linked gaming machines. The plurality of linked gaming machines are used for playing one or more wagering games having a plurality of symbols that indicate a randomly selected outcome of the wagering games. Each of the gaming machines includes at least one wager-input device for receiving a first type of wager and a second type of wager. The first type of wager allows the player to play the wagering game and the second type of wager allows the player to be eligible for the progressive jackpot. The controller is operative to determine a first cumulative value of the first type of wagers, determine a second cumulative value of the second type of wagers, and determine a distributable wager pool that is derived from a portion of the first cumulative value and a portion of the second cumulative value. The distributable wager pool can be used for funding the progressive jackpot.

In another aspect, the present invention is a method of playing wagering games on a plurality of gaming machines at which players may be eligible for a progressive jackpot. The method comprises receiving a first type of wager from players for playing the wagering games at the plurality of gaming machines, and receiving a second type of wager from the players at the plurality of gaming machines allowing the players to be eligible for the progressive jackpot. The method further involves determining a first cumulative value of the first type of wagers and determining a second cumulative value of the second type of wagers. Additionally, the method involves creating a distributable wager pool that is derived from a portion of the first cumulative value and a portion of the second cumulative value.

Alternatively, the present invention is a method of operating a plurality of gaming machines at which at least one progressive jackpot is accessible. The method comprises collecting wager-input data at the plurality of gaming machines that corresponds to wager inputs made at the plurality of gaming machines, wherein the wagering-input data includes a first data set corresponding to first wager inputs received for playing wagering games and a second data set corresponding to second wager inputs permitting eligibility to the progressive jackpot at the plurality of gaming machines. The method further includes creating a distributable wager pool that is derived from a portion of a value of the first data set and a portion of a value of the second data set, and using at least a portion of the distributable wager pool to fund the progressive jackpot.

The present invention can also be considered a progressive gaming system, which comprises a plurality of gaming machines, a network connecting the gaming machines, and a processor coupled to the network. Each gaming machine is adapted to receive a first type of wager for playing a wagering game on the gaming machine and to receive a second type of wager to enable a player of the gaming machine to be eligible for a progressive jackpot. The progressive jackpot is collectively associated with the plurality of gaming machines. The processor is coupled to the network and is adapted to calculate a first cumulative value of the first type of wagers for the plurality of gaming machines. The processor is further adapted to calculate a second cumulative value of the second type of wagers for the plurality of gaming machines. A distributable wager pool is derived from a portion of the first cumulative value and a portion of the second cumulative value. The distributable wager pool is used for funding the progressive jackpot.

The present invention can also be considered a method of playing a wagering game on a gaming machine. The method includes receiving a first type of wager from a player for playing the wagering game at the gaming machine, and receiving a second type of wager from the player at the gaming machine allowing the player to be eligible for a special award. The method also includes determining a first cumulative value of the first type of wagers, determining a second cumulative value of the second type of wagers, and creating a distributable wager pool that is derived from a portion of the first cumulative value and a portion of the second cumulative value.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

DESCRIPTION OF ILLUSTRATIVE EMBODIMENTS

Figure 1:
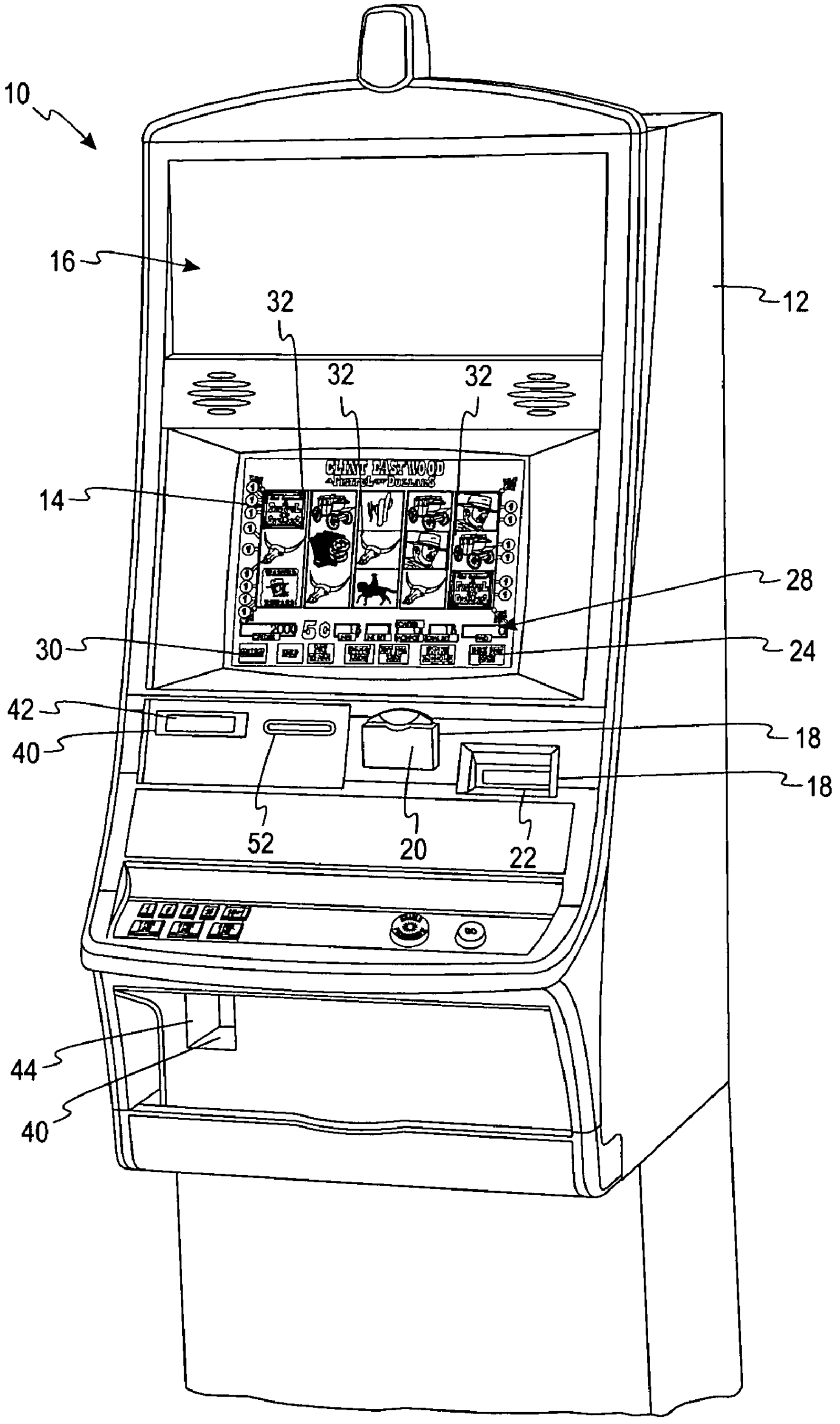
FIG. 1 is a perspective view of a gaming machine according to one embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel.

The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
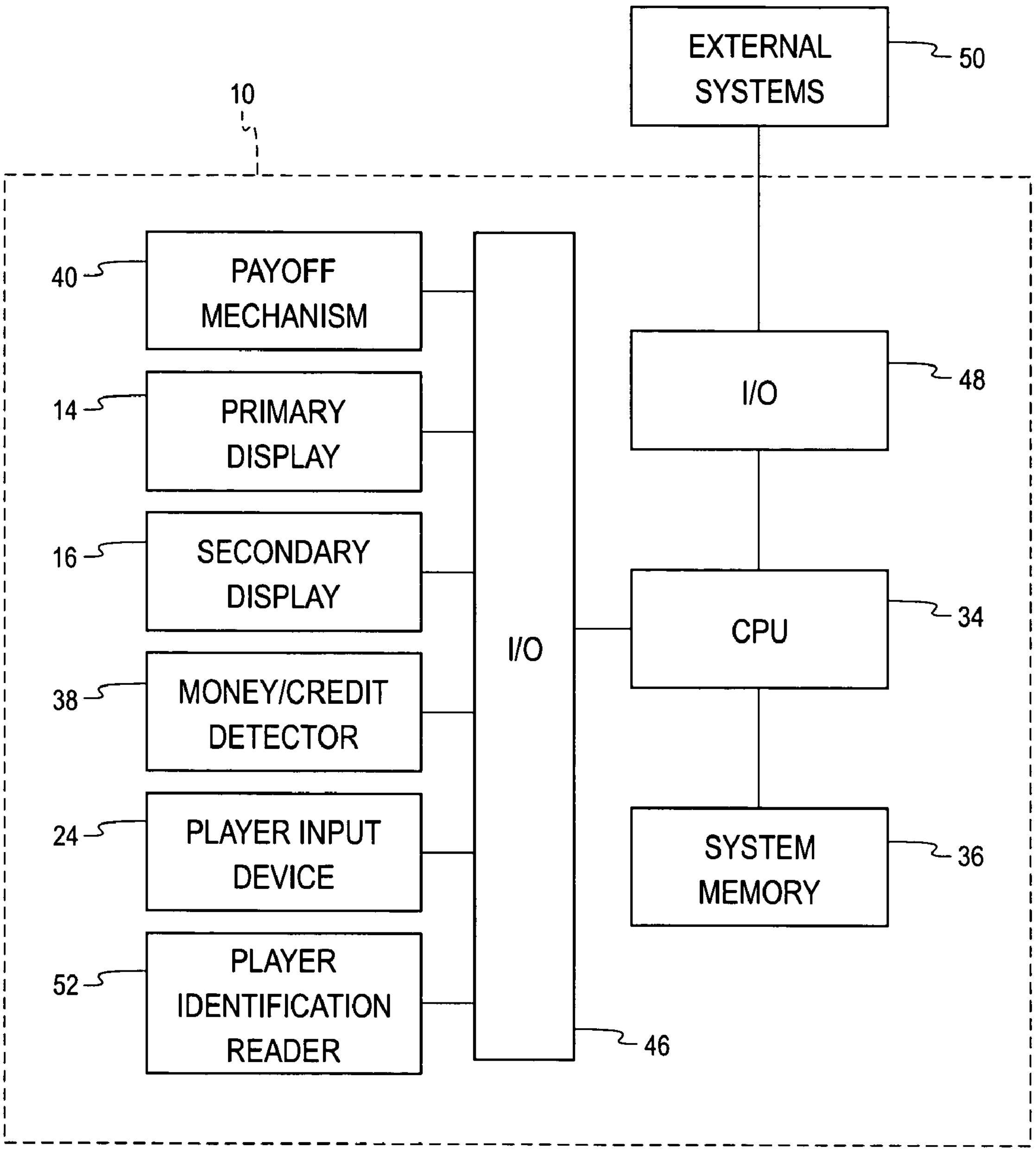
FIG. 2 is a block diagram of the gaming machine of FIG. 1.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
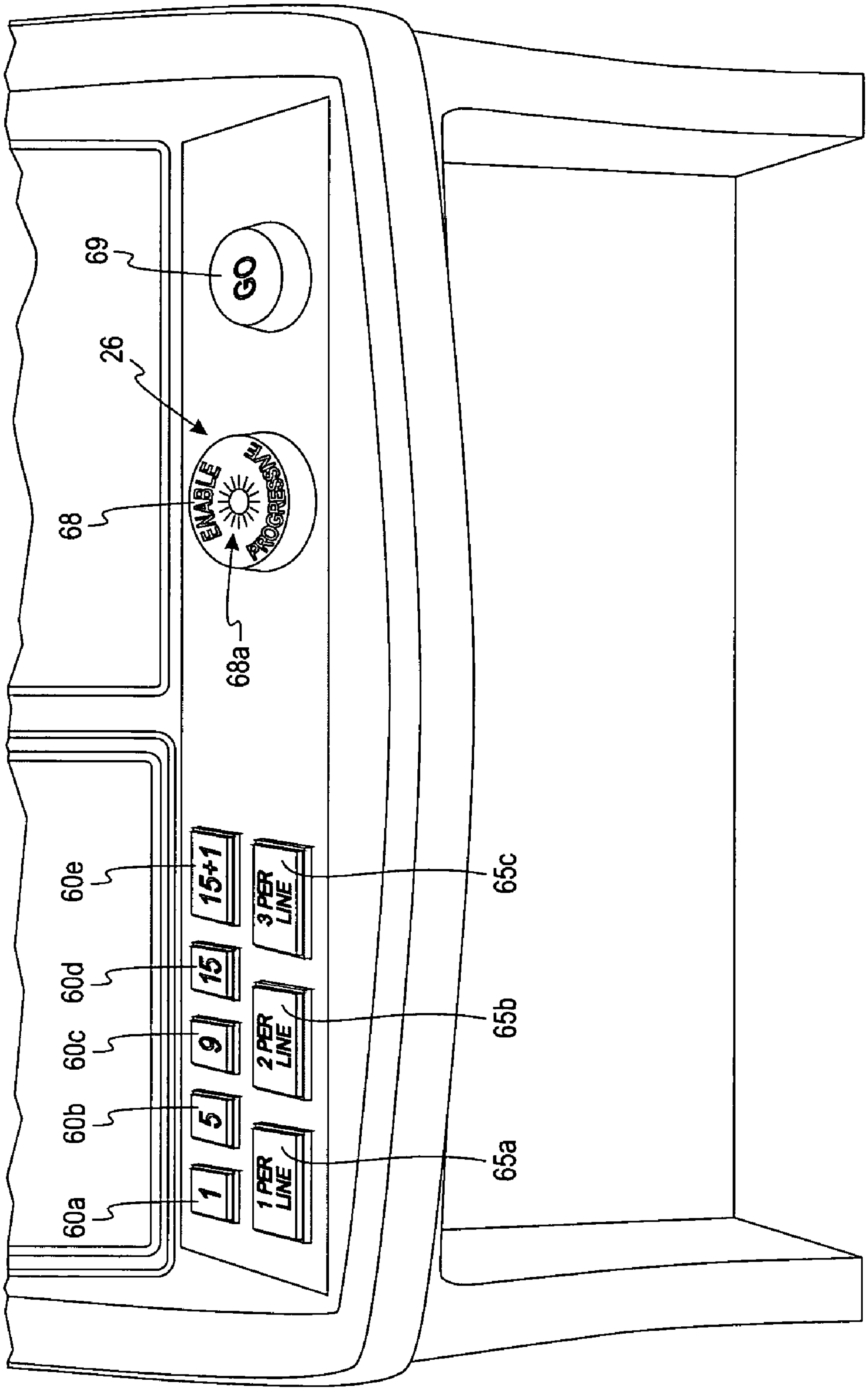
FIG. 3 illustrates the push-button panel of the gaming machine of FIG. 1.

Referring now to FIG. 3, the push button panel includes a plurality of different buttons 26 that serve different purposes. A plurality of payline buttons 60 indicates the number of paylines that the player desires to play during the wagering game. In the present gaming machine 10, there are fifteen paylines 72 (FIGS. 4 and 5) that the player may select during the wagering game. However, a gaming machine according to the present invention can include any number of paylines 72. The gaming machine 10 also includes bet-per-line buttons 65 to allow a player to place one, two, or three credit wagers on each of the fifteen paylines 72. While the present embodiment shows three bet-per-line buttons 65, the present invention is useful on gaming machines 10 having more or less of these bet-per-line buttons 65.

One of the payline buttons 60*e* allows the player to select all fifteen paylines 73 plus make an additional wager on a progressive game. When the player has depressed button 60*e* and then selects the "GO" button 69, the wagering game begins (e.g., reels 70 in FIG. 4 begin spinning) with the progressive event being conducted in conjunction with the wagering game.

Alternatively, the player can select the "15" payline button 60*d*, and then select an enable-progressive button 68 to cause the wagering game to begin. Likewise, a player can select one of the bet-per-line buttons 65 and then select the enable-progressive button 68 to start the wagering game. Actuating the enable-progressive button 68 causes an additional credit to be deducted from the player's credit meter so as to permit eligibility to the progressive game.

When a player takes these actions to select the progressive jackpot, a light 68*a* located within the enable-progressive button 68 is activated, allowing the player to note that he or she has activated the progressive game and that he or she is placing the additional wager. The light 68*a*, which is preferably an LED, is located behind the bezel such that the button 68 becomes lit when the progressive jackpot has been enabled. If the player depresses the enable-progressive button 68 while it is lit by the light 68*a*, the light 68*a* will then be turned off to indicate that the player has disabled his or her eligibility for the progressive game. The wagering game can then be conducted without the progressive game being activated. In other words, the player can make inputs to toggle between selection and deselection of the progressive game.

It should be noted that the progressive game in the illustrative embodiment not only requires the player to select activation of the progressive game, but the player must also meet predetermined criteria to allow for the selection of the progressive game. Specifically, in the example shown, if the player chooses less than all fifteen of the paylines 72, he or she cannot activate the progressive game. Other predetermined criteria can be employed as well, such as the identification of certain "lucky" players via a player tracking card, or requiring a certain amount of wagers within a predetermined time or predetermined number of spins. Alternatively, no predetermined criteria may be needed to select a progressive game, other than the additional wager.

Figure 4:
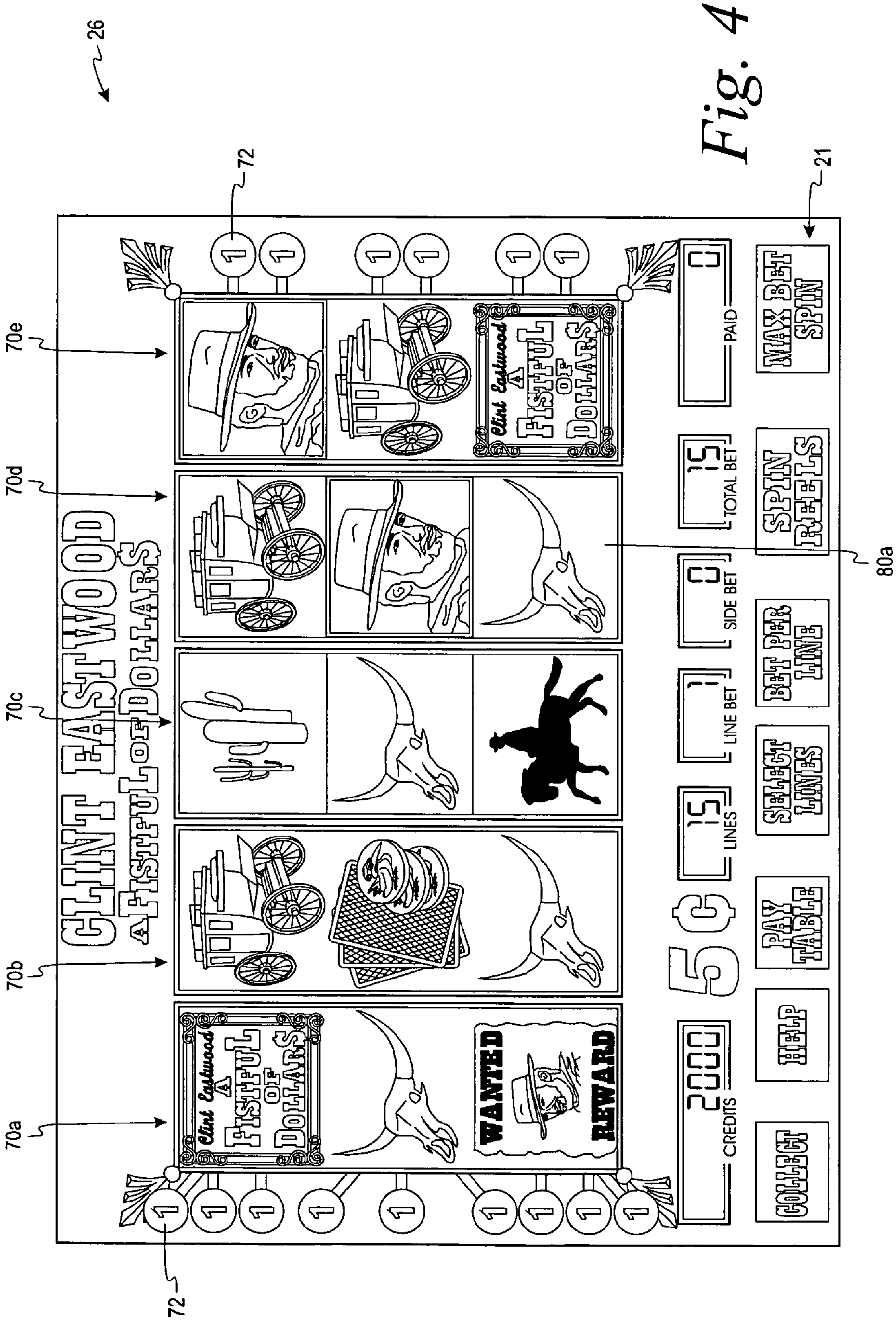
FIG. 4 illustrates the primary display having a plurality of video reels.

FIG. 4 illustrates the primary display 14 of the gaming machine 10, which includes a plurality of reels 70. The reels 70 include a plurality of symbols that are used to indicate a randomly selected outcome of the wagering game. A plurality of paylines 72 traverse the reels 70 in a horizontal or zigzag arrangement. A player selects one or more of the paylines 72 and the selected paylines become "active" paylines.

Figure 5:
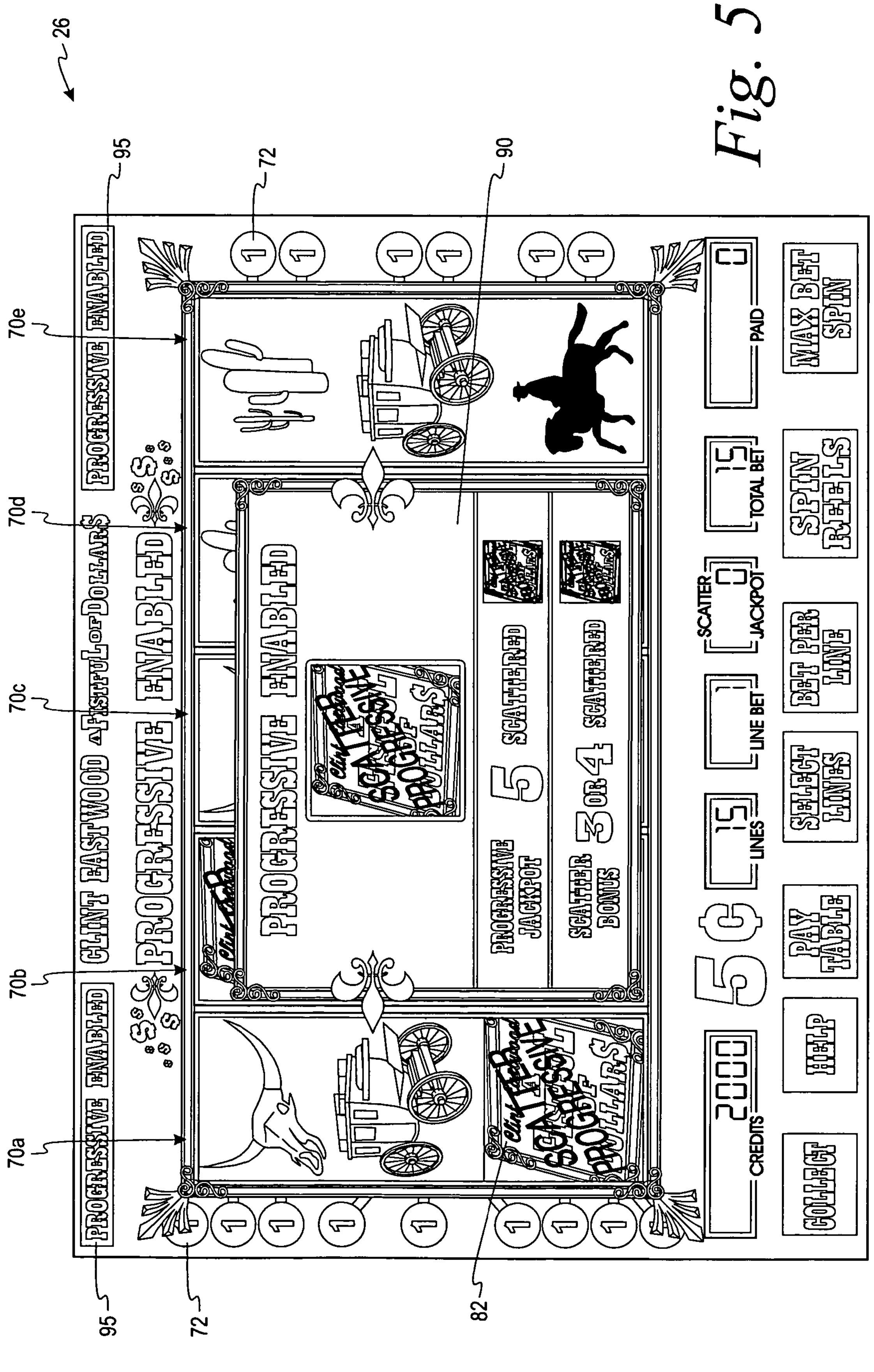
FIG. 5 illustrates the primary display after the player has activated the progressive game by placing an additional wager.

FIG. 5 illustrates the primary display 14 providing additional types of information for instructing the player that he or she has enabled the progressive game. Assuming the player has selected to play the progressive game and placed the extra wager associated with this selection, the primary display 14 has different mechanisms for informing the player that the progressive game has been selected. For example, a placard 90 has been displayed to instruct the player that the progressive game has been enabled. The placard 90 may also provide a mini-paytable that instructs the player what symbols are needed to achieve the progressive jackpot. And, the primary display 14 includes one or more banners 95 located at a desirable region. As shown, there are two banners 95 located horizontally at the top of the primary display 14. The main difference between the placard 90 and the banners 95 is that the placard 90 is displayed prior to the wagering game. On the other hand, the banners 95 can be displayed while the wagering game is ongoing, which in this case is while the reels 70 are spinning. Like the progressive enable button 68 (FIG. 3), the banners 95 and the placard 90 can be toggled on and off if the player chooses to deselect the progressive game.

Figure 6:
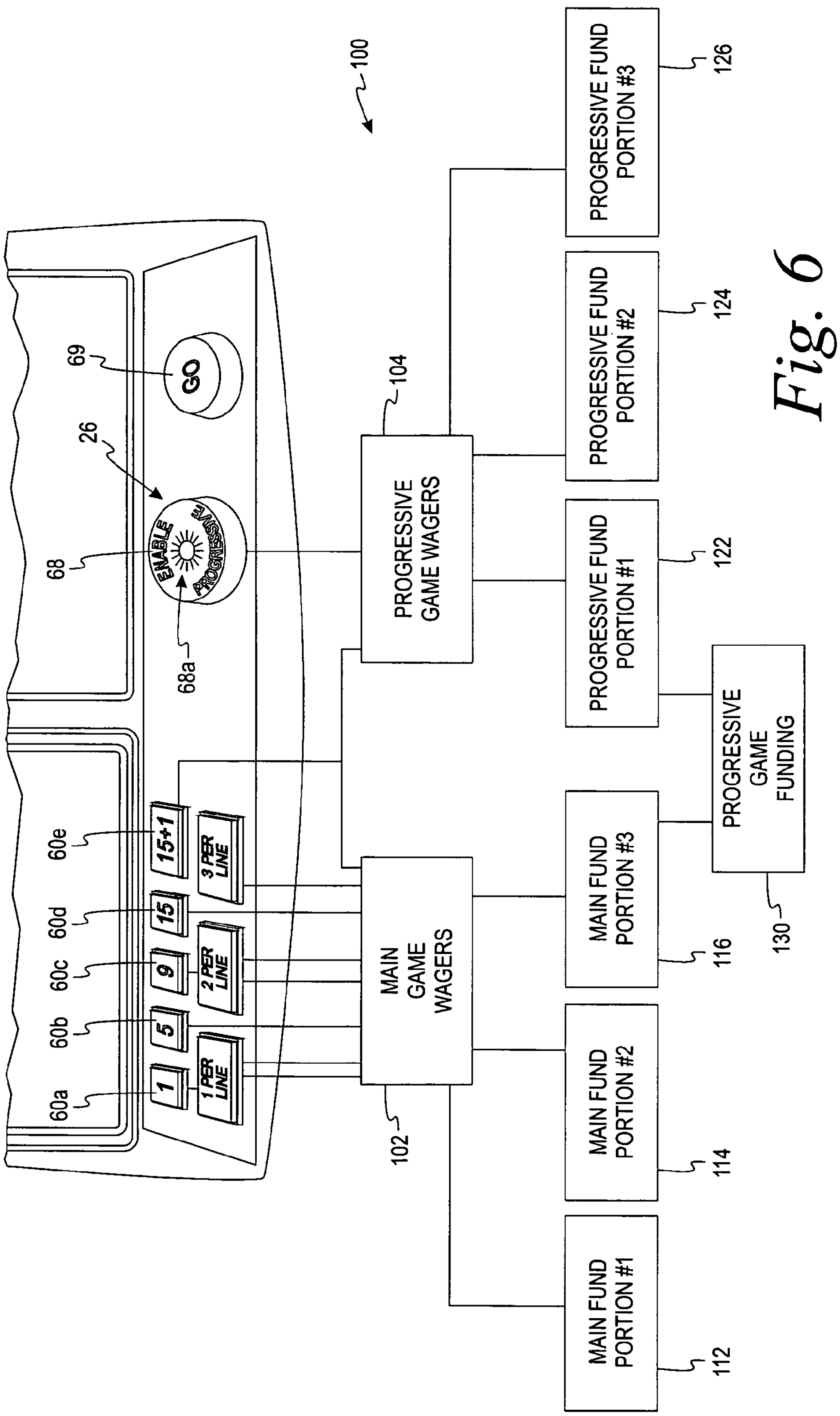
FIG. 6 illustrates a schematic of the different wagers being made and allocating those different wagers.

FIG. 6 schematically illustrates a progressive funding system 100 that is useful for progressive games in accordance with the present invention. As mentioned above, a player has the option to compete for the progressive jackpot by making an additional wager that creates eligibility for the progressive jackpot. As an example, the player can actuate the payline button 60*e* that automatically adds a progressive-game wager to the player's wagers on the fifteen paylines. Or, the player can select the payline button 60*d* (or one of the bet-per-line buttons 65) and the enable-progressive button 68 to be eligible for the progressive game. Of course, these are examples and other wagering games may have other rules for allowing a player to become eligible for the progressive jackpot (i.e., here, the rule is the player must place a wager on all fifteen paylines before being allowed to make the progressive wager).

The progressive funding system 100 monitors information related to two types of wagers. First, information related to main game wagers 102, which relate to the wagers placed on the wagering game (e.g., the video slot game in FIG. 4), is monitored. And second, information related to the progressive game wagers 104 is also monitored. As players make wagers on the main wagering game, at least one controller records the amount or value of the main game wagers 102. Likewise, the controller(s) records the amount of the progressive game wagers 104. The controller can be a controller that includes the CPU 34 (FIG. 2) within the gaming machine 10. Or, the controller can be a part of the external system 50 that controls the operation of the progressive game (i.e., a progressive game controller). In a further alternative, a local controller in the gaming machine 10 performs this monitoring and transmits the data to an external progressive game controller. Regardless of the location of the controller that monitors, the main game wagers 102 and the progressive game wagers 104 are preferably stored as distinct sets of data. As the wagers are made, these cumulative values of main game wagers 102 and the progressive game wagers 104 are updated real-time.

Each of the main game wagers 102 and the progressive game wagers 104 are ultimately used for different purposes. Hence, their respective cumulative values are apportioned for various purposes. The main game wagers 102 are split into different portions, e.g., main fund first portion 112, main fund second portion 114, and main fund third portion 116. Likewise, the progressive game wagers 104 are split into different portions, e.g., progressive fund first portion 122, progressive fund second portion 124, and progressive fund third portion 126. While FIG. 6 illustrates three fund portions for each of the main game wagers 102 and the progressive game wagers 104, more or less fund portions can be used. One example of a function for the different fund portions is progressive-game funding 130.

Typically, the controller(s) that receives and monitors the data associated with the main game wagers 102 and the progressive game wagers 104 also performs the apportioning function. Alternatively, a separate controller can conduct the apportioning function after receiving the needed data.

In one example, the fund portions derived from the different types of wagers 102 and 104 can be used for payouts in the main wagering game, for funding the progressive jackpot(s), for payment to the casino that leases the machines, and for payments to the gaming machine owner (e.g., the gaming machine manufacturer). One example of this lease-type arrangement would apportion the funds in accordance with the following percentages. With regard to the cumulative value of the main game wagers 102, the payouts for the main wagering game would receive an 88% portion of the value of the main game wagers 102. The casino that operates the gaming machines 10 would receive a 9% portion of the value of the main game wagers 102. The owner of the gaming machines 10 would receive a 3% portion of the value of the main game wagers 102. With regard to the cumulative value of the progressive game wagers 102, the progressive jackpots would receive an 80% portion of the value of the progressive game wagers 104. The casino that operates the gaming machines 10 would receive a 0% portion of the value of the progressive game wagers 104. The owner of the gaming machines 10 would receive a 20% portion of the value of the progressive game wagers 104. Obviously, other percentages would work, as well.

As indicated by the progressive game funding 130 in the illustrative embodiment of FIG. 6, the main game wagers 102 and some of the progressive game wagers 104 are used to fund the progressive fund. As mentioned above, the progressive jackpots would receive an 80% portion of the value of the progressive game wagers 102. In addition, focusing on the 3% portion of the main game wagers 102 that was received by the owner of the gaming machine, a 0.4% portion is directed to the progressive game funding 130 while 2.6% is maintained by the owner of the gaming machines.

Consequently, the progressive jackpot(s) is funded by a distributable wager pool derived from two different types of wagers placed on the gaming machines 10. First, a portion of the cumulative value of the main game wagers 102 is used (e.g., the 0.4% of the owner's portion, as discussed in the previous paragraph). And second, a portion of the cumulative value of the progressive game wagers 102 is used (e.g., the 80% of the overall additional wagers received by players who desire to be eligible for the progressive jackpot). As such, the progressive jackpot(s) has dual variable funding based on the amounts wagered in the main wagering game and the amounts wagered on the progressive game.

While the distributable wager pool has been described as being associated with the owner of the gaming machines since the owner is responsible for funding the progressive jackpot, creating multiple distributable wagers pools from the two types of wagers is possible. For example, a second distributable wager pool can be associated with the gaming machine operator (e.g., a casino) that adds its portion of the main game wagers 102 and its portion of the progressive game wagers 104. The distributable wager pool can also be the entire amount associated with the gaming machine owner (e.g., the 3% of the main game wagers 102 and 20% of the progressive game wagers, in the basic example above) and the gaming machine owner uses an amount from its overall pool to fund the reset value and incremental value of the progressive jackpot(s).

In another alternative embodiment, the enable-progressive button 68 may make the player eligible for winning the progressive jackpot and a special bonus-game event that is only achievable when the player makes the addition wager. Thus, one symbol or symbol combination may result in the player achieving the progressive jackpot. And, other symbols or symbol combinations may result in the player achieving the bonus-game event, which would typically have a smaller value than the progressive jackpot. These other symbols or symbol combinations would not provide payouts according to the pay table for the main wagering games. The funding for the payouts for the special bonus-game event and the progressive game can be from the same distributable wager pool derived from the main game wagers 102 and the progressive game wagers 104 (i.e., progressive game funding 130). Accordingly, when focusing on the credits that players wager to be eligible for the progressive jackpot (e.g., through the progressive-enable button 68), the overall payback percentage for those credits can be, for example, 88%, wherein 20% is derived by players from the payouts of the progressive jackpot (higher value, but less frequent) and 68% is derived from the payouts of the special bonus-game event (lower value, but more frequent). In the example of the lease-type arrangement mentioned above, the 88% payback percentage can be derived by adding the 80% portion of the value of the progressive game wagers 102 plus the 0.4% portion of the main game wagers 102.

By providing different payouts with the use of the special bonus-game event, the progressive funding system 100 can provide added flexibility to maintain player interest. As an example, if there is a long period between progressive jackpot payouts, the progressive game system can sense that players may lose interest in what appears to them to be an unattainable goal. Thus, additional funding can be allocated to the special bonus-game events so players are more likely to see positive results from the extra credit they wagered. The additional funding may be in the form of changes in both percentages from 20% (progressive jackpot) and 68% (special bonus-game event), to 15% and 73%, respectively, such that the payback percentage remains the same 88%. Alternatively, the payback percentage for each credit for the progressive game could increase from 88% to a higher value, e.g., 95%, with the additional payout percentage being allocated to the special bonus-game event. While the time period between progressive jackpots is one type of predetermined criteria that triggers the change to the percentages, other predetermined criteria could be used as well. In summary, the progressive game funding 130 is a distributable wager pool derived from portions of two types of wagers (main game wagers 102 and progressive game wagers 104) and can be used for the funding multiple types of payouts for players who have enabled the progressive game.

It should be noted that there are different systems for determining a progressive jackpot-won event at a gaming machine, and the present invention is useful for both. The first type is gaming-machine enabled, which occurs when a "progressive winning position" (i.e., a progressive jackpot winning outcome) is achieved at a participating gaming machine. A progressive-winning position is a module within a gaming machine's software code that responds with a progressive-jackpot-won event when certain game-level conditions are met, such as a winning reel position on a slot machine (e.g., certain progressive symbol combination). Only one progressive game may be assigned to a progressive winning position at a time. This position has a single winning percentage. At the time the progressive-winning position occurs at a gaming machine, the winning gaming machine is disabled from play and immediately transmits the jackpot-won event to the central system, such as external system 50 (FIG. 2). The central system calculates a final prize amount and transmits this amount to the winning gaming machine and to the other gaming terminals competing for the same progressive jackpot. The second type of jackpot-won event is central-system enabled. A progressive winning position is not used to generate a jackpot-won event when a progressive game awards a jackpot using a central-system-enabled jackpot-won event. An example may be a message sent from the central system to the gaming machine that places a wager that corresponds to a predetermined wager number (or amount) that triggers the progressive jackpot-won event. A central system-enabled jackpot-won event may, for example, be used in a mystery progressive system.

While the illustrated embodiment has primarily focused on creating a distributable wager pool from two different types of wagers that are received at a plurality of gaming machines that may participate in a progressive game, the distributable wager pool can be implemented relative to other special events having special awards. The special events may be available on a stand-alone gaming machine or on linked gaming machines that are not participating in a progressive game. As one example, the additional wager can be used to create eligibility in a community-event game where several players at several gaming machines may share an award. In such a case, the distributable wager pool could be used to fund some or all of the community-event award. In another example, the additional wager can be used to create eligibility to a bonus game (i.e., a secondary game) that can be activated at the gaming machine if certain conditions are met (e.g., a certain symbol combination is achieved). In such a case, the distributable wager pool could be used to fund some or all of the bonus-game awards on that gaming machine, or perhaps the bonus-game awards on several gaming machines that have the same type (or a similar type) of bonus game that is enabled by the additional wager. In a further example, the additional wager can be used to enable a special feature of a gaming machine that provides enhanced awards (e.g., an adjusted paytable for some symbol combinations) or increases the likelihood of a winning combination (e.g., adding an additional "wild" symbol). In such a case, the distributable wager pool could be used to fund some or all of the additional payouts that are expected due to the enablement of the special feature. The special event may be unrelated to symbols in the wagering game, such as a mystery award. In short, the distributable wager pool derived from two different types of wagers has many possible uses and may serve many possible functions.

While the present invention has been described with reference to one or more particular embodiments, those skilled in the art will recognize that many changes may be made thereto without departing from the spirit and scope of the present invention. For example, in embodiments illustrated in FIGS. 1-3, the main display 14 was a video display. It should be understood that the display 14 could also be mechanical reels. Also, progressive jackpots are often displayed on signage that is located proximate to (usually above) the gaming machines 10, which can also be done in accordance to the present invention. Each of these embodiments and obvious variations thereof is contemplated as falling within the spirit and scope of the claimed invention, which is set forth in the following claims.

What is claimed is:

1. A gaming system allowing players to be eligible for a progressive jackpot, comprising:

a plurality of linked gaming machines for playing one or more wagering games having a plurality of symbols that indicate a randomly selected outcome of said wagering games, each of said gaming machines including at least one wager-input device for receiving a first type of wager and a second type of wager, said first type of wager allowing said player to play said wagering game without allowing said player to be eligible for said progressive jackpot, said second type of wager being an optional wager made in addition to said first wager for allowing said player to be eligible for said progressive jackpot while playing said wagering game, said second type of wager being unassociated with said play of said wagering game; and a controller coupled to said plurality of gaming machines and operative to determine a first cumulative value of said first type of wagers, determine a second cumulative value of said second type of wagers, and determine a distributable wager pool that is derived from a portion of said first cumulative value and a portion of said second cumulative value, wherein said distributable wager pool is derived from a first percentage of said first cumulative value and a second percentage of said second cumulative value, said first percentage being different from said second percentage said controller further operative to determine a second distributable wager pool that is derived from a second portion of said first cumulative value and a second portion of said second cumulative value.

2. The system of claim 1, wherein said controller is further operative to, in response to said randomly selected outcome at one of said gaming machines being a progressive-jackpot winning outcome, award said player said progressive jackpot.

3. The system of claim 1, wherein said first and second types of wagers are both credits applied from a credit meter at said gaming machine.

4. The system of claim 1, wherein said controller is located external to said plurality of gaming machines.

5. The system of claim 1, wherein said distributable wager pool is associated with a first entity that owns said plurality of gaming machines.

6. The system of claim 5, wherein said second distributable wager pool is distributed to a second entity that operates said plurality of gaming machines.

7. The system of claim 5, wherein said distributable wager pool is equivalent to 3% of said first cumulative value plus 20% of said second cumulative value.

8. The system of claim 5, wherein said distributable wager pool is used for funding said progressive jackpot, said funding includes a reset amount after said progressive jackpot is won and increment amounts corresponding to said second types of wagers that are received at said plurality of gaming machines.

9. A method of playing wagering games on a plurality of gaming machines at which players may be eligible for a progressive jackpot, said method comprising:

receiving a first type of wager for playing said wagering games at said plurality of gaming machines, said first type of wager being made by a first group of players and a second group of players;

receiving a second type of wager at said plurality of gaming machines allowing players to be eligible for said progressive jackpot, said second type of wager being an optional wager made in addition to said first type of wager and being unassociated with said play of said wagering game, said second type of wager being optionally made by said first group of players, but not by said second group of players, such that only said first group of players are eligible for said progressive jackpot while playing said wagering games;

determining a first cumulative value of said first type of wagers;

determining a second cumulative value of said second type of wagers; and creating a distributable wager pool that is derived from a portion of said first cumulative value and a portion of said second cumulative value, wherein said creating said distributable wager pool includes deriving said distributable wager pool from a first percentage of said first cumulative value and a second percentage of said second cumulative value said first percentage being different from said second percentage; and creating a second distributable wager pool that is derived from a second portion of said first cumulative value and a second portion of said second cumulative value.

10. The method of claim 9, further including funding said progressive jackpot with a portion of said distributable wager pool.

11. The method of claim 9, further including, in response to receiving said first wager type and said second wager type at one of said gaming machines, conducting said wagering games including randomly selecting outcomes from a plurality of outcomes.

12. The method of claim 11, wherein said plurality of outcomes includes a progressive-jackpot winning outcome, and further including awarding said progressive jackpot in response to one of said randomly selected outcomes being said progressive-jackpot winning outcome.

13. The method of claim 9, further including notifying a player that said second type of wager has been made to provide eligibility to said progressive jackpot.

14. The method of claim 9, wherein said distributable wager pool is associated with an owner of said plurality of gaming machines.

15. The method of claim 14, wherein a portion of said distributable wager pool is used for funding said progressive jackpot.

16. The method of claim 14, wherein said second distributable wager pool is distributed to a second entity that operates said plurality of gaming machines.

17. A method of operating a plurality of gaming machines at which at least one progressive jackpot is accessible, said method comprising:

collecting wager-input data at said plurality of gaming machines that corresponds to wager inputs made at said plurality of gaming machines, said wagering-input data including a first data set corresponding to first wager inputs received for playing wagering games at said plurality of gaming machines and a second data set corresponding to second wager inputs permitting eligibility to said progressive jackpot at said plurality of gaming machines, said first wager inputs only allowing players to play said wagering games without being eligible for said progressive jackpot, each of said second wager inputs being optionally provided by a player in addition to said first wager input before playing said wagering game so as to allow said player to be eligible for said progressive jackpot while playing said wagering game;

creating a distributable wager pool that is derived from a portion of a value of said first data set and a portion of a value of said second data set, said creating said distributable wager pool includes deriving said distributable wager pool from a first percentage of said first cumulative value and a second percentage of said second cumulative value said first percentage being different from said second percentage; and creating a second distributable wager pool that is derived from a second portion of a value of said first data set plus a second portion of a value of said second data set; and using at least a portion of said distributable wager pool to fund said progressive jackpot.

18. The method of claim 17, wherein said distributable wager pool is associated with a first entity that owns said plurality of gaming machines, said second distributable wager pool is distributed to a second entity that operates said plurality of gaming machines.

19. The method of claim 18, wherein said distributable wager pool is equivalent to 3% of said value of said first data set plus 20% of said value of said second data set, and further including funding payouts of said wagering games with a fixed percentage of said first wager inputs that is in a range from about 88% to about 95% of said first wager inputs.

20. The method of claim 17, wherein said collecting and said creating are performed by at least one controller associated with a progressive gaming network to which said plurality of gaming machines are coupled.

21. A progressive gaming system having a progressive jackpot, comprising:

a plurality of gaming machines, each gaming machine receiving a first type of wager for playing a wagering game on said gaming machine, each gaming machine receiving a second type of wager to enable a player of said gaming machine to be eligible for said progressive jackpot, said progressive jackpot being collectively associated with said plurality of gaming machines, said second type of wager not being associated with said wagering game and only allowing a player who has made said first type of wager to be eligible for said progressive jackpot while playing said wagering game;

a network connecting said plurality of gaming machines; and a processor coupled to said network and adapted to calculate a first cumulative value of said first type of wagers for said plurality of gaming machines, said processor being further adapted to calculate a second cumulative value of the second type of wagers for said plurality of gaming machines, and wherein a distributable wager pool that is derived from a first percentage of said first cumulative value and a second percentage of said second cumulative value is used for funding said progressive jackpot, said second percentage being different from said first percentage; and wherein a second distributable wager pool is derived from a portion of said first cumulative value and a portion of said second cumulative value.

22. The system of claim 21, wherein said distributable wager pool is also used for funding a special bonus-game event.

23. The system of claim 22, wherein percentages of allocations of said distributable wager pool between said special bonus-game event and said progressive jackpot change based on predetermined criteria.

24. A method of playing a wagering game on a gaming machine, comprising:

receiving a first type of wager from a player for playing said wagering game at said gaming machine;

in addition to said first type of wager and before conducting said wagering game, receiving an optional second type of wager at said gaming machine allowing a player to be eligible for a special award while playing said wagering game;

determining a first cumulative value of said first type of wagers received by a plurality of players;

determining a second cumulative value of said second type of wagers received by a plurality of players; and creating a distributable wager pool that is derived from a first percentage of said first cumulative value and a second percentage of said second cumulative value, said second percentage being different from said first percentage; and creating a second distributable wager pool that is derived from a portion of said first cumulative value and a portion of said second cumulative value.

25. The method of claim 24, wherein said special award is one of a group selected from a bonus-game award for a bonus game played on said gaming machine, a progressive-jackpot award, a community-event award, and an award associated with a specific feature of said wagering game that can be enabled on said gaming machine.

26. The method of claim 24, wherein said special award is unrelated to symbols appearing in said wagering game.

27. The method of claim 24, further including funding said special award with at least a portion of said distributable wager pool.

* * * * *